United States Patent [19]

Robertiello et al.

[11] Patent Number: 4,479,978
[45] Date of Patent: Oct. 30, 1984

[54] BALANCED FEEDINGSTUFFS FOR RUMINANTS, AND THE METHOD FOR THEIR PRODUCTION

[75] Inventors: Andrea Robertiello, Rome; Leonello Angelini, Monterotondo; Ludwig Degen, Rome, all of Italy

[73] Assignee: E.N.I. Ente Nazionale Idrocarburi, Rome, Italy

[21] Appl. No.: 343,465

[22] Filed: Jan. 28, 1982

[30] Foreign Application Priority Data

Feb. 13, 1981 [IT] Italy ............................... 19718 A/81

[51] Int. Cl.$^3$ .............................................. A23K 1/00
[52] U.S. Cl. .................................... 426/636; 426/623; 426/626; 426/807; 426/624
[58] Field of Search ............... 426/635, 807, 626, 636, 426/623, 630, 624

[56] References Cited

U.S. PATENT DOCUMENTS 4,082,859 4/1978 Katzen ........................... 426/626 X
4,182,780 1/1980 Lagerstrom et al. ........... 426/626 X
4,273,659 6/1981 Robertiello et al. ............ 426/624 X

OTHER PUBLICATIONS

Morrison, "Feeds and Feeding", The Morrison Publishing Co., (1957), pp. 380-383 and 528-543.

Primary Examiner—R. B. Penland
Attorney, Agent, or Firm—Hedman, Gibson, Costigan & Hoare

[57] ABSTRACT

A description is given of the use of agricultural waste in the form of chemically treated cereal straw or fruit plant prunings together with the liquid residue from sugarbeet molasses in the production of balanced feedingstuffs suitable for feeding polygastric animals. The final useful mixture contains the agricultural waste as its main component and up to 60% of sugarbeet pulp, the remainder consisting of conventional additives.

3 Claims, No Drawings

BALANCED FEEDINGSTUFFS FOR RUMINANTS, AND THE METHOD FOR THEIR PRODUCTION

This invention relates to a method for producing balanced feedingstuffs which are particularly suitable for feeding polygastric animals, and to the products obtained in this manner.

More particularly, the invention relates to the use of agricultural waste in the form of chemically treated cereal straw or fruit plant prunings, together with the liquid residue from sugarbeet molasses normally known as spent sugarbeet pulp.

The use in the feedingstuffs industry of raw materials which up to a short time ago were considered as waste, represents an important objective to be pursued.

This is because the ratio of the amount of agricultural products used as human food to the amount used as animal feedingstuff is becoming increasingly more critical at the present time. It is therefore necessary for the feedingstuffs industry to find new areas of development in the field of national resources utilisation in order to keep both production costs and consequently the costs of the animal product low. Within this framework, progress has been made in the recent past in the chemical treatment of certain agricultural and agro-industrial products.

It has been known for some time that the treatment of cereal straw with alkali such as caustic soda or ammonia constitutes a valid method for increasing the digestibility of such agricultural waste. However, the product obtained by recent treatment processes still has two main drawbacks, the first being an almost complete absence of digestible proteins and the second being the presence of a high level of residual alkali from the treatment, which can compromise the nutritional value of the product especially if administered over long periods.

It is also known that spent sugarbeet pulp is of a certain interest in animal feeding, not only because of its calorific value but mainly because of its high level of highly digestible crude proteins.

The use of spent sugarbeet pulp is however limited by two considerable drawbacks. The first is related to the presence of a high water content which even in the concentrated product is on an average not less than 35–40%. This constitutes a limiting factor given that a feedingstuff is not allowed to contain more than 13% of water.

The second drawback is the presence of a high salt level, particularly the potassium ion. In the U.S. Pat. No. 4,273,659 of the Assignee granted on June 16, 1981 a process is described for obviating the aforesaid drawbacks with regard to the spent sugarbeet pulp.

The final product obtained from that process is characterised by a reduced salt content especially with regard to potassium, by the possibility of being easily concentrated to a water content of 20–25%, and by high acidity deriving from the desalination treatment.

The method according to the present invention has attained the object of overcoming the drawbacks attributable to the individual feedingstuff components described heretofore. Thus, the basicity of the agricultural waste treated with alkali is balanced by the acidity of the spent sugarbeet pulp.

The low protein content and high fibre content of the agricultural waste is balanced by the high digestible protein content of the spent sugarbeet pulp and its zero fibre content. The final water content of the product obtained by the method of the present invention has been kept constantly below the 13% threshold by means of a pressing-lump forming process for the studied mixtures, these thus constituting a product with further marketing advantages characteristically related to pelletised feedingstuffs. Thus, it has been shown by the present invention that if variable quantities of agricultural waste, either chemically treated or as such, are mixed with suitable quantities of concentrated spent sugarbeet pulp (up to 60%), either desalinated or as such, the aforesaid advantages can be obtained.

The feedingstuff formulations according to the present invention have been supplemented by small quantities of components other than the agricultural waste and spent sugarbeet pulp, in order to further improve their nutritional characteristics, especially with regard to their energy contribution and the mineral component balance.

The operational details will be more apparent from an examination of the examples given hereinafter for the sole purpose of better illustrating the invention, but without limiting its scope.

EXAMPLE 1

Preparation of straw treated with NaOH 2 tons of wheat straw were reduced in a blade mill to an average fibre length of about 4 cm. 0.1 tons of NaOH were dissolved in the minimum water quantity necessary for it to complete dissolve. These two raw materials were used to feed a mixing and lump forming plant fitted with a die having 2.5 cm bores. In this manner, 2.1 tons of wheat straw treated with 5% (weight/weight) caustic soda were obtained in lump form.

Preparation of the first suggested feedingstuff

Using the described plant, in which the die was replaced by a die with 1.5 cm bores, about 3.5 tons of feedingstuff in lump form were produced by suitably mixing together straw treated with caustic soda, concentrated spent sugarbeet pulp, corn meal and dicalcium phosphate in the percentage proportions given in Table 1.

TABLE 1

Percentage proportions (weight/weight) of the components used in the first suggested feedingstuff:

| | |
|---|---|
| Wheat straw treated with caustic soda (5%) | 60% |
| Concentrated spent sugarbeet pulp | 20% |
| Corn meal | 18% |
| Dicalcium phosphate | 2% |

The average chemical composition of the individual constituents of the first suggested feedingstuff and the theoretical composition of the mixture obtained before subjecting it to the pressing-lump forming operation (data referred to 100 kg of product) are given in Table 2.

TABLE 2

Chemical composition of the constituents and final mixture of the first suggested feedingstuff before the pressing-lump forming operation

| COMPONENT | kg | Moisture % | kg | Crude protides % | kg | Fibre % | kg | Lipids % | kg | Ash % | kg | Extractable non-nitrogenous % | kg |
|---|---|---|---|---|---|---|---|---|---|---|---|---|---|
| Treated straw | 60 | 11.6 | 7.0 | 4.2 | 2.5 | 41.7 | 25.0 | 2.0 | 1.2 | 14.1 | 8.5 | 26.4 | 15.8 |
| Conc. spent sugarbeet pulp | 20 | 49.0 | 9.8 | 19.1 | 3.8 | — | — | 0.5 | 0.1 | 14.9 | 3.0 | 16.5 | 3.3 |
| Corn meal | 18 | 13.0 | 2.3 | 9.2 | 1.7 | 2.3 | 0.4 | 4.1 | 0.7 | 1.6 | 0.4 | 69.8 | 12.5 |
| Dicalcium phosphate | 2 | 5.0 | 0.1 | — | — | — | — | — | — | 95.0 | 1.9 | — | — |
| TOTAL | 100 | — | 19.2 | — | 8.0 | — | 25.4 | — | 2.0 | — | 13.8 | — | 31.6 |

The pressing-lump forming system was suitably controlled so as to reduce the total water content, and the final product thus obtained was subjected to chemical analysis and to "in vitro" digestibility tests to evaluate its nutritional characteristics.

The results of these investigations are summarised in Table 3.

TABLE 3

Results of the chemical and "in vitro" digestibility investigations of the 1st suggested feedingstuff:

| | |
|---|---|
| Moisture | 12.7% |
| Crude proteins (N X 6.25) | 9.5% |
| Ash | 13.5% |
| Raw fibre | 21.7% |
| Crude lipids | 1.3% |
| Extractable non-nitrogenous | 41.3% |
| F.U. | 71.5 per 100 kg |

EXAMPLE 2

Preparation of straw treated with NaOH

The method described in Example 1 was followed, but with two differences, namely barley straw was used instead of wheat straw, and a smaller caustic soda quantity was used (3% of the straw, equivalent to 0.06 tons).

Preparation of the concentrated desalinated spent sugarbeet pulp 1.0 tons of spent sugarbeet pulp (having the composition given in Table 2), 0.129 tons of ethanol (containing 5% of water) and 0.051 tons of concentrated sulphuric acid (containing 2% of water) were fed into a stainless steel reactor fitted with a mechanical stirrer.

The precipitate obtained in this manner, and consisting principally of potassium sulphate, was removed by centrifuging, whereas the supernatant was fed to a concentration-distillation unit for recovering the ethanol.

On termination of the described operations, about 0.6 tons of desalinated concentrated spent sugarbeet pulp were obtained.

Preparation of the 2nd suggested feedingstuff

Using the plant described in Example 1, about 3 tons of feedingstuff in lump form were produced by mixing together straw treated with caustic soda, concentrated desalinated spent sugarbeet pulp, corn meal and dicalcium phosphate in the percentage proportions given in Table 4.

TABLE 4

Percentage proportions (weight/weight) of the components used in the 2nd suggested feedingstuff:

| | |
|---|---|
| Barley straw treated with caustic soda (3%) | 60% |
| Concentrated desalinated spent sugarbeet pulp | 20% |
| Corn meal | 18% |
| Dicalcium phosphate | 2% |

The average chemical composition of the individual constituents of the 2nd suggested feedingstuff and the theoretical composition of the mixture obtained before the pressing-lump forming operation (data referred to 100 kg of product) are given in Table 5.

TABLE 5

Chemical composition of the constituents and final mixture of the second suggested feedingstuff before the pressing-lump forming operation

| COMPONENT | kg | Moisture % | kg | Crude protides % | kg | Fibre % | kg | Lipids % | kg | Ash % | kg | Extractable non-nitrogenous % | kg |
|---|---|---|---|---|---|---|---|---|---|---|---|---|---|
| Treated straw | 60 | 10.6 | 6.4 | 2.9 | 1.7 | 37.5 | 22.5 | 1.6 | 1.0 | 10.1 | 6.1 | 37.3 | 22.3 |
| Conc. desalinated spent sugarbeet pulp | 20 | 33.4 | 6.7 | 25.4 | 5.1 | — | — | 0.6 | 0.1 | 11.0 | 2.2 | 29.6 | 5.9 |
| Corn meal | 18 | 13.0 | 2.3 | 9.2 | 1.7 | 2.3 | 0.4 | 4.1 | 0.7 | 1.6 | 0.4 | 69.8 | 12.5 |
| Dicalcium phosphate | 2 | 5.0 | 0.1 | — | — | — | — | — | — | 95.0 | 1.9 | — | — |
| TOTAL | 100 | — | 15.5 | — | 8.5 | — | 22.9 | — | 1.8 | — | 10.6 | — | 40.7 |

The pressing-lump forming system was suitably controlled in such a manner as to reduce the total water content, and the final product thus obtained was subjected to chemical analysis and to "in vitro" digestibility tests in order to evaluate its nutritional characteristics. The results of these investigations are summarised in Table 6.

TABLE 6

Results of the chemical and "in vitro" digestibility investigations of the 2nd suggested feedingstuff:

| | |
|---|---|
| Moisture | 9.8% |
| Crude proteins (N X 6.25) | 11.5% |
| Ash | 13.0% |
| Raw fibre | 26.2% |
| Crude lipids | 2.7% |
| Extractable non-nitrogenous | 37.2% |
| F.U. | 73.8 per 100 kg |

EXAMPLE 3

1.5 tons of barley straw were prepared by the method of Example 1 and 2, and 0.9 tons of concentrated desalinated spent sugarbeet pulp were prepared by the method of Example 2.

Preparation of the 3rd suggested feedingstuff

Using the plant described in Example 1, about 3 tons of feedingstuff in lump form were produced by mixing together straw treated with caustic soda, concentrated desalinated spent sugarbeet pulp, corn meal and dicalcium phosphate in the percentage proportions given in Table 7.

TABLE 7

Percentage proportions (weight/weight) of the components used in the 3rd suggested feedingstuff:

| | |
|---|---|
| Barley straw treated with caustic soda (3%) | 50% |
| Concentrated desalinated spent sugarbeet pulp | 30% |
| Corn meal | 18% |
| Dicalcium phosphate | 2% |

The average chemical composition of the individual constituents of the 3rd suggested feedingstuff and the theoretical composition of the mixture obtained before the pressing-lump forming operation (data referred to 100 kg of product) are given in Table 8.

TABLE 8

Chemical composition of the constituents and final mixture of the third suggested feedingstuff before the pressing-lump forming operation

| COMPONENT | kg | Moisture % | Moisture kg | Crude protides % | Crude protides kg | Fibre % | Fibre kg | Lipids % | Lipids kg | Ash % | Ash kg | Extractable non-nitrogenous % | Extractable non-nitrogenous kg |
|---|---|---|---|---|---|---|---|---|---|---|---|---|---|
| Treated straw | 50 | 10.6 | 5.3 | 2.9 | 1.4 | 37.5 | 18.8 | 1.6 | 0.8 | 10.1 | 5.0 | 37.3 | 18.7 |
| Conc. desalinated spent sugarbeet pulp | 30 | 33.4 | 10.0 | 25.4 | 7.6 | — | — | 0.6 | 0.2 | 11.0 | 3.3 | 29.6 | 8.9 |
| Corn meal | 18 | 13.0 | 2.3 | 9.2 | 1.7 | 2.3 | 0.4 | 4.1 | 0.7 | 1.6 | 0.4 | 69.8 | 12.5 |
| Dicalcium phosphate | 2 | 5.0 | 0.1 | — | — | — | — | — | — | 95.0 | 1.9 | — | — |
| TOTAL | 100 | — | 17.7 | — | 10.7 | — | 19.2 | — | 1.7 | — | 10.6 | — | 40.1 |

The pressing-lump forming system was suitably controlled in such a manner as to reduce the total water content, and the final product thus obtained was subjected to chemical analysis and "in vitro" digestibility tests in order to evaluate its nutritional characteristics. The results of these investigations are summarized in Table 9.

TABLE 9

Results of the chemical and "in vitro" digestibility investigations of the 3rd suggested feedingstuff:

| | |
|---|---|
| Moisture | 10.1% |
| Crude proteins (N × 6.25) | 13.2% |
| Ash | 13.1% |
| Raw fibre | 22.3% |
| Crude lipids | 1.9% |
| Extractable non-nitrogenous | 39.4% |
| F.U. | 80.3 per 100 kg |

EXAMPLE 4

Preparation of vine runner meal

About 1.5 tons of vine stems obtained as a result of pruning were reduced in a mill about one month after the harvest, to an average size of about 2.5 cm.

Preparation of the 4th suggested feedingstuff

Using the plant described in Example 1, about 3 tons of feedingstuff in the form of lumps were produced by mixing together vine runner meal, concentrated desalinated spent sugarbeet pulp (prepared as described in Example 2), corn meal and dicalcium phosphate in the percentage proportions given in Table 10.

TABLE 10

Percentage proportions (weight/weight) of the components used in the 4th suggested feedingstuff:

| | |
|---|---|
| Vine runner meal | 50% |
| Concentrated desalinated spent sugarbeet pulp | 30% |
| Corn meal | 18% |
| Dicalcium phosphate | 2% |

The average chemical composition of the individual components of the 4th suggested feedingstuff and the theoretical composition of the mixture obtained before the pressing-lump forming operation (data referred to 100 kg of product) is given in Table 11.

TABLE 11

Chemical composition of the constituents and final mixture of the fourth suggested feedingstuff before the pressing-lump forming operation

| COMPONENT | kg | Moisture % | Moisture kg | Crude protides % | Crude protides kg | Fibre % | Fibre kg | Lipids % | Lipids kg | Ash % | Ash kg | Extractable non-nitrogenous % | Extractable non-nitrogenous kg |
|---|---|---|---|---|---|---|---|---|---|---|---|---|---|
| Vine runner meal | 50 | 20.1 | 10.0 | 4.3 | 2.1 | 31.1 | 15.6 | 1.5 | 0.8 | 9.0 | 4.5 | 34.0 | 17.0 |
| Conc. desalinated spent sugarbeet pulp | 30 | 33.4 | 10.0 | 25.4 | 7.6 | — | — | 0.6 | 0.2 | 11.0 | 3.3 | 29.6 | 8.9 |
| Corn meal | 18 | 13.0 | 2.3 | 9.2 | 1.7 | 2.3 | 0.4 | 4.1 | 0.7 | 1.6 | 0.4 | 69.8 | 12.5 |
| Dicalcium phosphate | 2 | 5.0 | 0.1 | — | — | — | — | — | — | 95.0 | 1.9 | — | — |
| TOTAL | 100 | — | 22.4 | — | 11.4 | — | 16.0 | — | 1.7 | — | 10.1 | — | 38.4 |

The pressing-lump forming system was suitably controlled in such a manner as to reduce the total water content, and the final product was subjected to chemical analysis and to "in vitro" digestibility tests in order to evaluate its nutritional characteristics.

The results of these investigations are summarised in Table 12.

TABLE 12

Results of the chemical and "in vitro" digestibility investigations of the 4th suggested feedingstuff:

| | |
|---|---|
| Moisture | 10.8% |
| Crude proteins (N X 6.25) | 13.0% |
| Ash | 11.3% |
| Raw fibre | 19.2% |
| Crude lipids | 1.9% |
| Extractable non-nitrogenous | 43.8% |
| F.U. | 67.7 per 100 kg |

We claim:

1. A method of producing a nutritionally balanced feedingstuff for ruminants, said method consisting essentially of combining alkali treated straw in an amount effective to balance up to 60% of concentrated desalinated spent sugarbeet pulp said feedingstuff also containing added corn meal and dicalcium phosphate.

2. A method of producing a balanced feedingstuff as defined in claim 1 wherein the alkali used to treat the straw is sodium hydroxide.

3. A method of producing a balanced feedingstuff as defined in claim 2 which includes the additional step of carrying out a pressing lump forming operation on the combined ingredients.

* * * * *